(12) United States Patent
Megard et al.

(10) Patent No.: US 9,571,144 B2
(45) Date of Patent: Feb. 14, 2017

(54) SYNCHRONISED RADIO TRANSCEIVERS

(75) Inventors: Kenneth Megard, Trondheim (NO);
Ole Saether, Trondheim (NO); Ola Marvik, Trondheim (NO); Frank Berntsen, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 0 days.

(21) Appl. No.: 14/124,239

(22) PCT Filed: Jun. 7, 2012

(86) PCT No.: PCT/GB2012/051279
§ 371 (c)(1),
(2), (4) Date: Dec. 5, 2013

(87) PCT Pub. No.: WO2012/168711
PCT Pub. Date: Dec. 13, 2012

(65) Prior Publication Data
US 2014/0120971 A1    May 1, 2014

(30) Foreign Application Priority Data
Jun. 7, 2011 (GB) .................................. 1109520.5

(51) Int. Cl.
*H04W 52/00* (2009.01)
*H04B 1/10* (2006.01)
(Continued)

(52) U.S. Cl.
CPC .............. *H04B 1/109* (2013.01); *H04B 1/525* (2013.01); *H04B 1/406* (2013.01)

(58) Field of Classification Search
CPC .......... H04J 3/0676; H04B 10/00; H04L 5/14; H04W 56/00
See application file for complete search history.

(56) References Cited

U.S. PATENT DOCUMENTS 5,864,592 A * 1/1999 Itri ................................ 375/375
7,190,690 B2    3/2007 Tuomela et al.
(Continued)

FOREIGN PATENT DOCUMENTS

| JP | 2003101500 | 4/2003 |
|---|---|---|
| JP | 2004129066 | 4/2004 |
| WO | WO 03/071741 A1 | 8/2003 |

OTHER PUBLICATIONS

NPL Bluetooth Time Division Duplex—fixed time slots by JP Lynch Jr., Nov. 18, 2002.*
(Continued)

*Primary Examiner* — Wesley Kim
*Assistant Examiner* — Dong-Chang Shiue
(74) *Attorney, Agent, or Firm* — Koppel, Patrick, Heybl & Philpott

(57) ABSTRACT

Synchronized radio transceivers Disclosed are a method of and apparatus for controlling a first radio transceiver (18) and a second radio transceiver (20) which are connected to a common oscillator (16), wherein each transceiver (18, 20) is capable of communicating with one or more remote radio transceivers (12, 14). The method comprises: •the first transceiver (18) sending a synchronization signal to the second transceiver (20); and •the second transceiver (20) using the synchronization signal to en¬ sure that neither transceiver (18, 20) transmits data while the other transceiver is in a receiving state.

39 Claims, 1 Drawing Sheet

Figure 1:
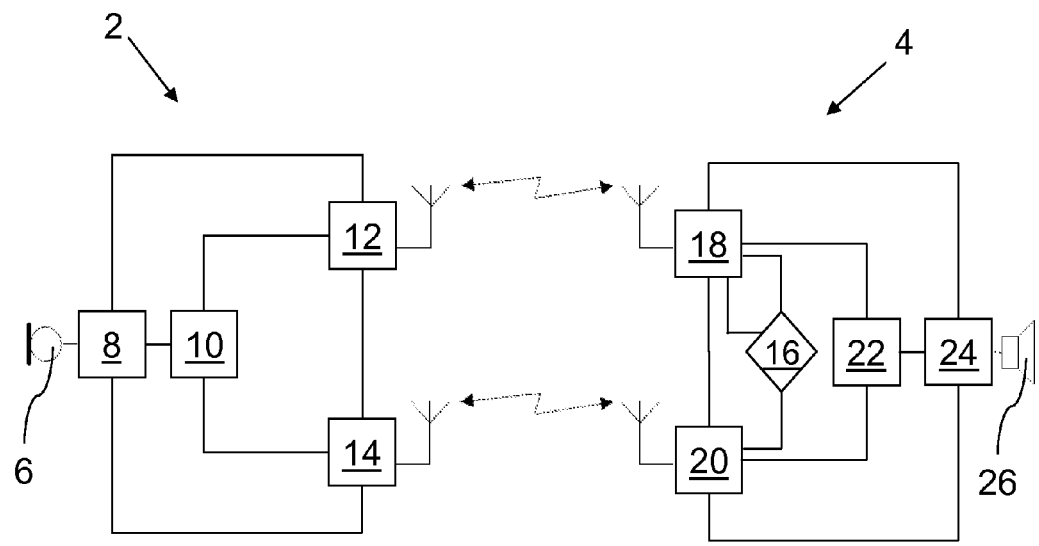

(51) Int. Cl.
H04B 1/525 (2015.01)
H04B 1/403 (2015.01)

(56) References Cited

U.S. PATENT DOCUMENTS

2004/0005870 A1   1/2004   Yla-Jaaski et al.
2008/0139200 A1*  6/2008   Zhu et al. .................. 455/426.1
2008/0247367 A1   10/2008  Guo et al.
2009/0086712 A1   4/2009   Liu et al.
2009/0297164 A1*  12/2009  Horiuchi ....................... 398/154

OTHER PUBLICATIONS

NPL Half-Duplex at fixed period—TI—A powerline communication Line Driver by Ramus, Nov. 2009.*
International Search Report (PCT/ISA/210) for PCT/GB2012/051279 mailed Oct. 5, 2012.
Japanese Office Action Notice of Reasons for Refusal for Patent Application No. 2014-514149 dated May 24, 2016.

* cited by examiner

SYNCHRONISED RADIO TRANSCEIVERS

This invention relates to the synchronisation of multiple radio transceivers.

A linked pair of radio transceivers may be used to send data between remote locations. One example is streaming digital audio data packets by radio from a wireless microphone to a public address system. A bi-directional radio link allows an acknowledgement message to be sent in respect of each data packet, which can improve reliability.

Radio channels have limited bandwidth. It is therefore known to operate multiple radios in parallel, on different frequency channels, in order to send more data between two devices than can be accommodated reliably over a single channel.

A difficulty with this approach is that the multiple radio transceivers on a device are typically situated in close proximity to each other. This can lead to transmissions from one of the radio transceivers interfering with simultaneous reception of radio signals at the other radio transceiver on the same device. Such interference may occur even when the two radios are operating on different frequency bands, since there may be leakage between nearby bands (e.g. adjacent-channel interference).

The present invention seeks to address this difficulty.

From one aspect, the invention provides a method of controlling a first radio transceiver and a second radio transceiver which are connected to a common oscillator, wherein each transceiver is capable of communicating with one or more remote radio transceivers, the method comprising:

the first transceiver sending a synchronisation signal to the second transceiver; and the second transceiver using the synchronisation signal to ensure that neither transceiver transmits data while the other transceiver is in a receiving state.

From a further aspect, the invention provides a system comprising a first radio transceiver and a second radio transceiver which are connected to a common oscillator, wherein each transceiver is capable of communicating with one or more remote radio transceivers, wherein:

the first transceiver is configured to send a synchronisation signal to the second transceiver; and the second transceiver is configured to use the synchronisation signal to ensure that neither transceiver transmits data while the other transceiver is in a receiving state.

From another aspect the invention provides a radio transceiver arranged for connection to an oscillator, and being capable of communicating with one or more remote radio transceivers, wherein the transceiver is configured:

to receive a synchronisation signal from a second transceiver connected to the same oscillator, and to use the synchronisation signal to ensure that the transceiver does not transmit data while the second transceiver is in a receiving state and to ensure that the transceiver is not in a receiving state while the second transceiver transmits data.

Thus it will be seen by those skilled in the art that, in accordance with the invention, two transceivers can use a shared oscillator to coordinate their radio operations so as to avoid a situation in which one is transmitting while the other is receiving. They can thereby avoid interference which might otherwise occur if this situation were permitted.

A further advantage of such an arrangement is that, by sharing a oscillator, manufacturing costs can be reduced. This is especially the case where, as in preferred embodiments, the oscillator is a crystal oscillator. Moreover, the radio system may be physically smaller and/or have a lower power consumption than a prior-art arrangement having two independent crystal oscillators.

Each transceiver may switch periodically from a transmitting state, in which the transceiver is able to transmit data, to a receiving state, in which the transceiver is able to receive data, and the time period between each successive switching to the receiving state may be substantially the same for both transceivers. Each transceiver may regulate its switching into the receiving state using a signal from the oscillator.

The second receiver may use the synchronisation signal to control a phase offset between the periodic switching of the first transceiver and the periodic switching of the second transceiver in order that neither transceiver transmits data while the other transceiver is in a receiving state.

The synchronisation signal may take any suitable form. In some embodiments, the first transceiver sends a signal, such as a pulse or a change in the logic state of a digital communication line, at a predetermined position within its switching cycle, such as when it enters the receiving state.

The synchronisation signal may be a one-off signal (e.g. sent once during a communication session), or it may be sent multiple times during a communication session. It may be sent at regular or irregular intervals, or continuously. In some embodiments, the synchronisation signal is sent once every switching period, or an integer number of times every switching period, or once every integer number of switching periods.

The synchronisation signal may comprise a square wave of period equal to the switching period (i.e. the time interval between successive switches into the receive state by the first transceiver). Alternatively, the square wave may have a period equal to an integer multiple of the switching period (e.g. double the switching period), or equal to an integer fraction of the switching period (e.g. half). The square wave may be generated by toggling a link between a logical "1" (e.g. a high voltage) and a logical "0" (e.g. a low or zero voltage).

The synchronisation square wave is preferably in a predetermined phase relationship with the periodic switching of the first transceiver, for example, rising when the first radio transceiver switches to the receiving state (or alternatively the transmitting state).

The second transceiver may be configured to generate a local signal identical to the synchronisation signal, e.g. a local square wave having the same period as the synchronisation square wave. The local signal may have a predetermined phase relationship with the periodic switching of the second transceiver, e.g. rising when the second radio transceiver switches to the receiving state (or alternatively the transmitting state). The second transceiver may be configured to delay or advance the timing of its switching period so as to align in time the local signal with the received synchronisation signal; e.g. to align the rising edges of a local square wave and a synchronisation square wave. In this way, the second transceiver can synchronise the timing of its transmitting and receiving states so as to avoid transmitting data when the first transceiver is in a receiving state, and so as to avoid being in a receiving state when the first transceiver may be transmitting.

The synchronisation signal is preferably sent over an optical, electronic or mechanical connection between the first and second radio transceivers. In this way, it is not necessary to transmit a radio synchronisation signal between the two transceivers.

The oscillator is not limited to any particular type of oscillator (e.g. it could be a resistor-capacitor oscillator circuit), but it is preferably a crystal oscillator, as this can provide very precise timing.

The first and second radio transceivers may comprise, or be located wholly or partially within, a common housing. The oscillator (e.g. a crystal oscillator) may also be located in the housing. The first and second transceivers may be connected to respective microcontroller units (MCU), but in some preferred embodiments, they are connected to a common MCU.

The first radio transceiver is preferably an integrated circuit, e.g. a radio-on-a-chip. It may have an integrated or external antenna. Similarly the second radio transceiver is preferably an integrated circuit, e.g. a radio-on-a-chip, and may have an integrated or external antenna. The two radio transceivers may comprise, or be formed on, a common silicon chip.

However, in some embodiments the first and second radio transceivers are, or comprise, respective identical integrated circuits. Each integrated circuit may be configured to receive a designation instruction, which determines whether the integrated circuit operates as the first transceiver (i.e. sending a synchronisation signal) or as the second transceiver (i.e. using the synchronisation signal).

The designation instruction may comprise a logic signal received by the integrated circuit on an input pin (e.g. with logic "1" instructing the chip to take the role of the first transceiver, and logic "0" the role of the second transceiver).

The designation instruction may be sent by a microcontroller unit (MCU) to one or both of the first and second radio transceivers.

Thus, it can be possible to use the same silicon chip design for both transceivers, leading to reduced manufacturing costs compared with a system which requires two different silicon chips for the respective roles.

This idea is inventive in its own right, and from a further aspect the invention provides a radio transceiver arranged for connection to an oscillator, and being capable of communicating with one or more remote radio transceivers, wherein the transceiver is configured:
  to receive a designation instruction indicating whether it is to act as a master transceiver or a slave transceiver;
  when acting as a master device, to send a synchronisation signal to a second transceiver connected to the same oscillator; and
  when acting as a slave device, to receive a synchronisation signal from a second transceiver connected to the same oscillator, and to use the synchronisation signal to ensure that the transceiver does not transmit data while the second transceiver is in a receiving state and to ensure that the transceiver is not in a receiving state while the second transceiver transmits data.

Because the two radio transceivers can synchronise their communications without involvement from an MCU (other than possibly determining which is to be the first, "master" transceiver and which is to be the second, "slave" transceiver), it need not be necessary to program an MCU or other external processor to perform a synchronisation operation. It is therefore relative straightforward to integrate radio transceivers (e.g. two silicon chips) embodying the invention into a device, since they coordinate their transmissions without requiring a separate processor on the device to run any synchronisation software.

The transceivers preferably toggle directly from the transmitting state to the receiving state and back again in one switching period. However, this is not essential, and one or both transceivers may instead be configured to enter one or more further states, such as a sleep state, within the switching period. There may be some switching delay while each radio transceiver deactivates receiving or transmitting circuitry and activates transmitting or receiving circuitry.

The durations of the transmitting states of the first and second transceivers are preferably equal or substantially equal. Similarly, the durations of the receiving states of the first and second transceivers are preferably equal or substantially equal. The first and second transceivers preferably both switch from the receiving state to the transmitting state at the same point within their respective switching periods (e.g. the same length time after entering the receiving states), although this is not essential.

In some embodiments, the first transceiver may be in the receiving state for substantially the same length of time as it is in the transmitting state; e.g. spending half the period in each state; this may similarly be the case for the second transceiver. However, in preferred embodiments, the transceivers may be in a transmitting state for substantially less time than they are in a receiving state. This is because, in some applications, the data flow may be asymmetric to or from the radio transceivers. For example, where the first and second transceivers form part of a wireless karaoke sound amplification system, communicating with two wireless microphones, the first and second transceivers may be configured to receive audio data for most of the cycle, and only to transmit short acknowledgement messages at intervals.

The transceivers need not necessarily be actively receiving data while in a receiving state; however, they will typically have radio receiver circuitry powered up while in this state. Similarly, the transceivers need not necessarily be actively transmitting data while in a transmitting state; however, they will typically have radio transmitter circuitry powered up while in this state. In some embodiments, though, the transceivers may transmit data whenever they are in the transmitting state.

The second transceiver may use the synchronisation signal to eliminate or substantially eliminate any offset between the periodic switching of the first transceiver and the periodic switching of the second transceiver; i.e. to adjust any offset to zero. However, it may adjust the offset to a non-zero value based on an adjustment criterion, so long as the offset is such that neither transceiver will transmit data while the other transceiver is in a receiving state. Because the transceivers need not necessarily switch directly from one state to the other, and because they need not be transmitting data continuously while in a transmitting state, it may be possible for one transceiver to be in a transmitting state while the other is in a receiving state without the former transceiver actually transmitting data.

A non-zero offset could be desirable if the first and second transceivers share a power supply which has peak current limitations. In such a case, it may be possible to set the offset such that the transceivers do not transmit at the same time as each other, in order to limit the combined peak power consumption of the transceivers. In general, however, it is envisaged that a zero offset will be more desirable.

One or both transceivers is preferably arranged for half-duplex radio communication with the remote apparatus. The remote apparatus may comprise third and fourth radio transceivers, arranged for radio communication with the first and second transceivers respectively (thereby defining first and second radio links with the first and second transceivers respectively). For example, the left channel of a stereo audio stream may be transmitted from the third transceiver to the first transceiver, while the right channel is simultaneously transmitted from the fourth transceiver to the second transceiver.

The third and fourth radio transceivers may be configured to synchronise their radio transmissions from synchronisation information sent by radio from the first and/or second radio transceivers. In this way, the first transceiver can effectively synchronise all four transceivers in the system.

Of course, more than two transceivers may share a common oscillator. The first transceiver may act as a master transceiver for a plurality of slave transceivers, each configured similarly to the aforementioned second transceiver. All of the transceivers may use a signal from a common oscillator, and the master transceiver may send a synchronisation signal to all of the slave transceivers. In this way, three or more transceivers in a device may be synchronised so that none of them transmits data while any of the others is in a receiving state. Remote, paired radio transceivers may be synchronised using a suitable radio protocol.

Radio transceivers embodying the invention may transmit and/or receive analogue data (e.g. FM or AM encoded), but it is preferred that the data are digital data, encoded in any suitable manner. In some embodiments the transceivers transmit and/or receive audio or video data.

Figure 2:
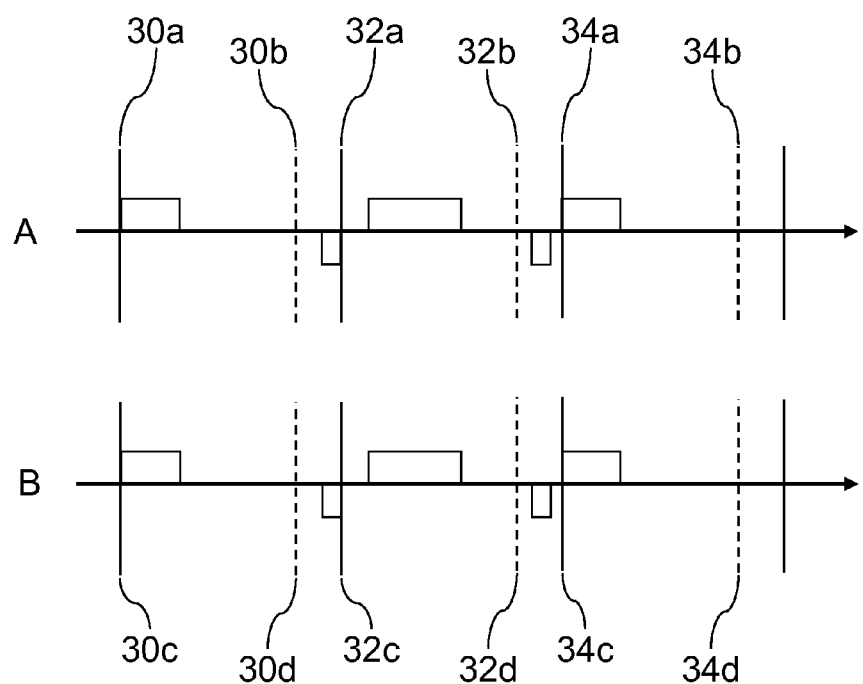

Certain preferred embodiments of the invention will now be described, by way of example only, with reference to the accompanying drawings, in which:

FIG. 1 is a schematic view of a radio communication system embodying the invention; and FIG. 2 is timing diagram for an exemplary data exchange.

FIG. 1 shows a wireless microphone device 2 which is linked by radio to a remote public address system 4. The wireless microphone device 2 comprises a microphone element 6 which is connected to an analogue-to-digital converter (ADC) 8.

The digital output of the ADC 8 is fed to a first 2.4 GHz radio audio transmitter chip (ATX1) 12 and also to a second 2.4 GHz radio audio transmitter chip (ATX2) 14. Each audio transmitter 12, 14 can transmit streamed data at a rate of 512 kbps (32 kHz×16 bit).

The ADC 8, the ATX1 12 and the ATX2 14 are all connected to a microcontroller unit (MCU) 10, which is also housed within the wireless microphone device 2.

Located at a distance from the wireless microphone device 2 is the public address system 4. This comprises a first 2.4 GHz radio audio receiver chip (ARX1) 18 and a second 2.4 GHz radio audio receiver chip (ARX2) 20. The outputs of both are connected to a digital-to-analogue converter (DAC) 24.

A crystal oscillator 16 is arranged to supply a 16 MHz clock signal to both the ARX1 18 and the ARX2 20. It is also connected to a second pin on the ARX1 18 (but not similarly for the ARX2 20). An output from the ARX1 18 is connected to a synchronisation input on the ARX2 20.

Each of the ARX1 18, the ARX2 20 and the DAC 24 is connected to a microcontroller (MCU) 22.

The analogue output of the DAC 24 is connected to a loudspeaker 20 in the public address system 4.

Additional components such as amplifiers, filters, power supplies, etc. are not shown for the sake of clarity, but are arranged and operated in a conventional manner.

In use, audible sound is received continuously by the microphone 6. This signal is digitised at 1024 kbps by the ADC 8, and the digital signal is split into two time-divided halves under the direction of the MCU 10. The two 512 kbps half signals are sent to the ATX1 12 and ATX2 14 respectively. The radio audio transmitter chips ATX1 12 and ATX2 14 divide their respective data streams into streams of discrete data packets, which they transmit by radio on two respective channels in the 2.4 GHz band. Each audio transmitter chip transmits a set of data packets in a transmit phase of a periodic transmission cycle, as explained in more detail below.

The ARX1 is configured to use the same channel as the ATX1, while the ARX2 is configured to use the same channel as the ATX2.

Once the data packets are received by the ARX1 18 and the ARX2 20 in the public address system 4, they are assembled in the correct order and the data within the packets are extracted to form two 512 kbps data streams mirroring the original streams produced by the ADC 8 in the wireless microphone device 2. The data streams are combined in the DAC 18, under the control of the MCU 22, to give a continuous analogue output which is amplified and played through the loudspeaker 26.

The audio receivers ARX1 18 and ARX2 20 are configured to transmit acknowledgement messages back to the audio transmitters ATX1 12 and ATX2 14 in respect of each received data frame.

FIG. 2 shows three successive switching periods of the ARX1 18 (marked A) and the ARX2 20 (marked B) along two vertically-aligned horizontal time axes, with time flowing from left to right.

Both the first audio receiver chip ARX1 18 and the second audio receiver chip ARX2 20 receive a 16 MHz clock signal from the crystal oscillator 16 which they use to regulate their internal functioning.

The ARX1 18 also receives a second 16 MHz clock signal (identical to the first) which it uses in particular to regulate a flywheel which controls the duty cycle for when it enters and leaves radio transmitting and radio receiving modes. The flywheel runs at a fixed frequency (e.g. 333 Hz) derived from the crystal signal.

As shown in FIG. 2, the ARX1 18 enters a receiving mode at the beginning of a first switching cycle 30a, at a time set by the flywheel timer. After a predetermined time 30b, it switches to a transmitting mode, which it remains in until the next switching cycle 32a. At the start of the second switching cycle 32a, set by the flywheel, the ARX1 18 reverts to the receiving mode. After the same predetermined time 32b, it switches to the transmitting mode. This pattern continues for subsequent cycles 34a, 34b.

The ARX2 20 operates very similarly, entering a receiving mode at the beginning of a first switching cycle 30c, at a time set by an internal flywheel. After a predetermined time 30d, it switches to a transmitting mode, which it remains in until the next switching cycle 32c.

Because the two audio receivers ARX1 18, ARX2 20 run on the same crystal clock, their respective flywheels will be synchronised; i.e. they will not drift relative to each other.

The ARX2 20 controls the phase of its internal flywheel, relative to the flywheel in the ARX1 18, using a synchronisation signal it receives from the ARX1 18.

After power-on, the ARX1 18 outputs a square wave derived from its flywheel on a synchronisation output pin. The ARX2 20 generates an identical internal square wave and reads the edges of the square wave it receives from the ARX1 18 on a synchronisation input pin. The ARX2 20 can then, if necessary, delay its flywheel so that the edges of the two square waves line up. In this way, a common phase reference is established, so that the ARX2's flywheel can be maintained in perfect synchronisation with the ARX1's flywheel, or so that it can be maintained at a predetermined offset therefrom. A register on the ARX2 may be used to configure a target offset. Typically, the target offset is likely to be zero.

The step size for offset delay configuration may be about 16 microseconds. The MCU 22 may be configured to adjust the offset in steps and to determine an optimum phase relationship, e.g. by determining a level of radio interference and providing this as feedback to the adjustment mechanism.

Performance of the ARX1 18 and ARX2 20 with an offset of zero is illustrated in FIG. 2. For each audio receiver, rectangles above the time line represent data transmitted by the respective audio transmitter 12, 14 while the audio receivers are in their receiving states, while rectangles below the line represent acknowledgement messages transmitted by the audio receivers while they are in their transmission states. The diagram is not to scale.

Thus it is possible to coordinate the transmissions of multiple radio transceivers so as to provide better performance by reducing mutual interference.

The invention claimed is:

1. A method of controlling a first radio transceiver and a second radio transceiver which are connected to a common oscillator, wherein each of the first radio transceiver and the second radio transceiver is capable of communicating with one or more remote radio transceivers, the method comprising:
the first radio transceiver sending a synchronisation signal to the second radio transceiver;
the second radio transceiver generating a local signal identical to the synchronisation signal;
each of the first radio transceiver and the second radio transceiver switching periodically with a fixed period from a transmitting state, in which the first radio transceiver and the second radio transceiver are able to transmit data, to a receiving state, in which the first radio transceiver and the second radio transceiver are able to receive data; and
the second radio transceiver using the local signal to control a phase offset between the periodic switching of the first radio transceiver and the periodic switching of the second radio transceiver in order that neither the first radio transceiver nor the second radio transceiver transmits data while the other radio transceiver is in the receiving state.

2. The method as claimed in claim 1 wherein the common oscillator is a crystal oscillator.

3. The method as claimed in claim 1 wherein a time period between each successive switching to the receiving state is substantially the same for both the first radio transceiver and the second radio transceiver.

4. The method as claimed in claim 1 comprising each of the first radio transceiver and the second radio transceiver regulating its switching into the receiving state using a signal from the common oscillator.

5. The method as claimed in claim 1 comprising the first radio transceiver sending the synchronisation signal at a predetermined position within its switching cycle.

6. The method as claimed in claim 5 wherein the synchronisation signal comprises a square wave in a predetermined phase relationship with the periodic switching of the first radio transceiver.

7. The method as claimed in claim 1 comprising the second radio transceiver delaying or advancing the timing of its switching period so as to align in time the local signal with the received synchronisation signal.

8. The method as claimed in claim 1 comprising sending the synchronisation signal over an optical, electronic or mechanical connection between the first and second radio transceivers.

9. The method as claimed in claim 1 wherein the first and second radio transceivers are, or comprise, respective identical integrated circuits.

10. The method as claimed in claim 9 comprising each integrated circuit receiving a designation instruction which determines whether the integrated circuit operates as the first radio transceiver or as the second radio transceiver.

11. The method as claimed in claim 1 comprising the first radio transceiver and the second radio transceiver toggling directly from the transmitting state to the receiving state and back again in one switching period.

12. The method as claimed in claim 1 wherein the durations of the transmitting states of the first and second radio transceivers are equal or substantially equal.

13. The method as claimed in claim 1 wherein the durations of the receiving states of the first and second radio transceivers are equal or substantially equal.

14. The method as claimed in claim 1 wherein the first and second radio transceivers both switch from the receiving state to the transmitting state at the same point within their respective switching periods.

15. The method as claimed in claim 1 wherein the first radio transceiver and the second radio transceiver are in a transmitting state for less time than they are in a receiving state.

16. The method as claimed in claim 1 wherein one or both of the first radio transceiver and the second radio transceiver carries out half-duplex radio communication with the remote apparatus.

17. The method as claimed in claim 1 wherein the remote apparatus comprises third and fourth radio transceivers in radio communication with the first and second radio transceivers respectively.

18. The method as claimed in claim 17 wherein the third and fourth radio transceivers synchronise their radio transmissions from synchronisation information sent by radio from the first and/or second radio transceivers.

19. The method as claimed in claim 1 wherein the first radio transceiver and the second radio transceiver transmit and/or receive audio or video data.

20. A system comprising a first radio transceiver and a second radio transceiver which are connected to a common oscillator, wherein each transceiver is capable of communicating with one or more remote radio transceivers, wherein:
the first radio transceiver is configured to send a synchronisation signal to the second radio transceiver;
the second radio transceiver is configured to generate a local signal identical to the synchronisation signal;
each of the first radio transceiver and the second radio transceiver is configured to switch periodically at a fixed period from a transmitting state, in which the first radio transceiver and the second radio transceiver are able to transmit data, to a receiving state, in which the first radio transceiver and the second radio transceiver are able to receive data; and
the second radio transceiver is configured to use the local signal to control a phase offset between the periodic switching of the first radio transceiver and the periodic switching of the second radio transceiver in order that neither the first radio transceiver nor the second radio transceiver transmits data while the other radio transceiver is in the receiving state.

21. The system as claimed in claim 20 wherein the common oscillator is a crystal oscillator.

22. The system as claimed in claim 20 wherein a time period between each successive switching to the receiving state is substantially the same for both the first radio transceiver and the second radio transceiver.

23. The system as claimed in claim 20 wherein each of the first radio transceiver and the second radio transceiver is configured to regulating its switching into the receiving state using a signal from the common oscillator.

24. The system as claimed in claim 20 wherein the first radio transceiver is configured to send the synchronisation signal at a predetermined position within its switching cycle.

25. The system as claimed in claim 24 wherein the synchronisation signal comprises a square wave in a predetermined phase relationship with the periodic switching of the first radio transceiver.

26. The system as claimed in claim 20 wherein the second radio transceiver is configured to delay or advance the timing of its switching period so as to align in time the local signal with the received synchronisation signal.

27. The system as claimed in claim 20 wherein the synchronisation signal is sent over an optical, electronic or mechanical connection between the first and second radio transceivers.

28. The system as claimed in claim 20 wherein the first and second radio transceivers are, or comprise, respective identical integrated circuits.

29. The system as claimed in claim 28 wherein each integrated circuit is configured to receive a designation instruction which determines whether the integrated circuit operates as the first radio transceiver or as the second radio transceiver.

30. The system as claimed in claim 20 wherein the first radio transceiver and the second radio transceiver are configured to toggle directly from the transmitting state to the receiving state and back again in one switching period.

31. The system as claimed in claim 20 wherein the durations of the transmitting states of the first and second radio transceivers are equal or substantially equal.

32. The system as claimed in claim 20 wherein the durations of the receiving states of the first and second radio transceivers are equal or substantially equal.

33. The system as claimed in claim 20 wherein the first and second radio transceivers are both configured to switch from the receiving state to the transmitting state at the same point within their respective switching periods.

34. The system as claimed in claim 20 wherein the first radio transceiver and the second radio transceiver are in a transmitting state for less time than they are in a receiving state.

35. The system as claimed in claim 20 wherein one or both of the first radio transceiver and the second radio transceiver is configured for half-duplex radio communication with the remote apparatus.

36. The system as claimed in claim 20 wherein the remote apparatus comprises third and fourth radio transceivers in radio communication with the first and second radio transceivers respectively.

37. The system as claimed in claim 36 wherein the third and fourth radio transceivers are configured to synchronise their radio transmissions from synchronisation information sent by radio from the first and/or second radio transceivers.

38. The system as claimed in claim 20 wherein the first radio transceiver and the second radio transceiver are arranged to transmit and/or receive audio or video data.

39. A radio communication apparatus arranged for connection to an oscillator, and being capable of communicating with one or more remote radio transceivers, wherein the radio communication apparatus comprises:
   a radio transceiver configured to receive a synchronisation signal from a second transceiver connected to the same oscillator, to generate a local signal identical to the synchronisation signal;
   wherein the radio transceiver is further configured to periodically switch at a fixed period from a transmitting state, in which the transceiver is able to transmit data, to a receiving state, in which the transceiver is able to receive data; and
   wherein the radio transceiver is further configured to use the local signal to control a phase offset between the periodic switching of the radio transceiver and the periodic switching of the second transceiver in order that neither the radio transceiver nor the second transceiver transmits data while the second transceiver is in a receiving state.

* * * * *